United States Patent [19]

Furusawa et al.

[11] Patent Number: 4,858,171

[45] Date of Patent: Aug. 15, 1989

[54] WORD PROCESSOR WITH SELECTIVE PLACEMENT OF PRINTHEAD FOR PRINTING OF NEWLY INPUT PRINT DATA AFTER INTERRUPTION OF PRINTING

[75] Inventors: Tadao Furusawa; Hiroshi Mitsuyuki; Hironobu Sato; Yujiro Tatsuno; Shigeru Matsuoka, all of Hitachi, Japan

[73] Assignee: Hitachi, Ltd., Tokyo, Japan

[21] Appl. No.: 14,365

[22] Filed: Feb. 13, 1987

[30] Foreign Application Priority Data

Feb. 26, 1986 [JP] Japan .................................. 61-39254

[51] Int. Cl.[4] .......................... G06F 3/03; G06F 3/09; G06F 3/12
[52] U.S. Cl. ...................................... 364/900; 400/63; 364/235; 364/225.6; 364/225.8; 364/226.1
[58] Field of Search ... 364/200 MS File, 900 MS File; 400/63, 68

[56] References Cited

U.S. PATENT DOCUMENTS

| | | | |
|---|---|---|---|
| 3,829,855 | 8/1974 | Kolpek et al. | 364/900 |
| 4,028,680 | 6/1977 | Vittorelli | 364/900 |
| 4,282,583 | 8/1981 | Khan et al. | 364/900 |
| 4,284,362 | 8/1981 | Jackson et al. | 364/900 |
| 4,393,463 | 7/1983 | Aiken, Jr. | 400/63 |
| 4,403,301 | 9/1983 | Fessel | 364/900 |
| 4,445,795 | 5/1984 | Levine et al. | 400/68 |
| 4,553,206 | 11/1985 | Smutek et al. | 364/300 |
| 4,553,860 | 11/1985 | Imaizumi et al. | 364/900 |
| 4,639,151 | 1/1987 | Ueno et al. | 400/63 |
| 4,780,008 | 10/1988 | Ueno et al. | 400/63 |
| 4,786,894 | 11/1988 | Furusawa et al. | 400/63 |

FOREIGN PATENT DOCUMENTS 0158767 2/1985 European Pat. Off.

OTHER PUBLICATIONS

R. J. Gerlach et al., *System for Simplified Form Fill-In Using CRT Display*, IBM Tech. Discl. Bull., vol. 21, No. 11 Apr. 1979 pp. 1423-4329.

J. S. Coenen et al., *Interactive Forms Positioning with Delayed Print*, IBM Tech. Disclos. Bull. vol. 19 No. 8 Jan. 1977 p. 2821.

*Primary Examiner*—Archie E. Williams, Jr.
*Assistant Examiner*—Eric Coleman
*Attorney, Agent, or Firm*—Antonelli, Terry & Wands

[57] ABSTRACT

The print interrupt control codes are contained in the document. The printing is stopped when the print interrupt control code is detected during printing the document, and a train of characters is newly prepared under this condition. The printing operation is interrupted when the print interrupt control code appears during the printing which is performed in accordance with the document data stored in the temporary storage means, and whereby the input processing means is placed in operation so that the new train of characters can be input and processed. The word processor has function to print the newly prepared train of characters when the printing is resumed, and to easily effect the insert printing.

2 Claims, 4 Drawing Sheets

XYZ & CO. ☐ LTD.

WORD PROCESSOR WITH SELECTIVE PLACEMENT OF PRINTHEAD FOR PRINTING OF NEWLY INPUT PRINT DATA AFTER INTERRUPTION OF PRINTING

BACKGROUND OF THE INVENTION 1. (Field of the Invention)

The present invention relates to a word processor having an insert printing function, and more particularly to a word processor having an insert printing function which is adapted to newly preparing a train of characters by interrupting the printing and to printing the train of characters inclusive of the newly prepared train of characters. In particular, a portable type word processor, which is not equipped with the device for storing a plurality of the documents, can be adapted.

2. (Description of the Prior Art)

There has been proposed a word processor, having a printing head and which is equipped with a print interrupt code key on a keyboard to input a print interrupt control code onto the document like other character codes. Such word processors have been described in, for example, "Instruction Manual (Functions)" of Japanese Language Word Processor, Shoin, WD-600/WD-605, 1985, of Sharp Co.

The word processor has also been so contrived that, when the print interrupt control code is detected during the printing, the operation of printing is interrupted and the printing head is automatically moved to a predetermined position, however, it is not allowed to insert a new printing such as printing while changing a portion of the train of characters of the document.

The word processor has also been so contrived that, in order to print the trains of characters in different colors, when the print interrupt control code is detected during the printing, the operation of printing is interrupted and the printing head is automatically moved to a predetermined position, so that an inked ribbon can be renewed to resume the printing.

A word processor has been so contrived that, in order to change the print start position, when the print interrupt control code is detected, a new paragraph is started and then the printing is interrupted, and the printing is resumed after the paper is moved or renewed. However, it is not allowed to insert a new printing such as printing while changing a portion of the train of characters of the document.

In the above-mentioned prior art, consideration had not been given in regard to newly preparing the train of characters under the condition where the printing is interrupted upon the detection of the print interrupt control code, or to print the train of characters including the thus newly prepared train of characters.

In a portable type word processor without having a memory device such as a floppy disc device which is capable of storing a plurality of the documents, in particular, it is not allowed to insert a new printing such as printing while changing a portion of the train of characters of the document. When such a need has arisen, therefore, the train of characters in the document must, first, be corrected and, then, the printing must be effected at one time. Namely, the package printing method must be effected.

SUMMARY OF THE INVENTION

An object of the present invention is to provide a word processor having an insert printing function wherein the insert printing can be obtained easily.

Another object of the present invention is to provide a word processor having an insert printing function which is not equipped with the device for storing a plurality of the documents wherein the function of insert printing can be provided.

Further object of the present invention is to provide a word processor having an insert printing function wherein the insert printing can be effected onto the regular paper as well as to the superposed printing.

Still object of the present invention is to provide a word processor having an insert printing function wherein the printing to trains of characters can be performed in any color.

Still more object of the present invention is to provide a word processor having an insert printing function wherein the function to print the newly prepared train of characters can be obtained when the printing is resumed.

In the present invention, a word processor comprises an input means for inputting characters and code data, a display means for displaying characters and codes corresponding to data which are input, a printing means for printing characters and codes displayed on the display means, and a central control means for controlling the input means, the display means and the printing means.

The central control means further comprises an input processing means for preparing the document data consisting of characters and codes depending upon the document data input from the input means, a temporary storage means for storing the document data and a print interrupt control code, and a print control means for reading the document data from the temporary storage means, sending the document data to the printing means to print the document data, and temporarily interrupting the printing when the print interrupt control code is detected.

The above-mentioned objects are achieved by providing a means which interrupts the printing and operates the input processing means when the print interrupt control code is detected during the printing.

The print control means selectively determines the positions for printing the train of characters input during the moment of print interrupt depending upon the input from the input means.

The print control means provides with a means for deleting the input characters from the temporary storage means after printed the input characters during the moment of print interrupt.

The printing operation is interrupted when the print interrupt control code appears during the printing which is performed in accordance with the document data stored in the temporary storage means, and whereby the input processing means is placed in operation so that the new train of characters can be input and processed.

According to the present invention, the print interrupt control codes are contained in advance in the document, the printing is stopped when the print interrupt control code is detected during printing the document, and the train of characters is newly prepared under this condition.

According to the present invention, a word processor has function to print the newly prepared train of characters when the printing is resumed, to easily effect the insert printing even when the word processor is not equipped with memory such as a floppy disc to store the documents.

DETAILED DESCRIPTION OF THE PREFERRED EMBODIMENTS

A word processor having an insert printing function according to one embodiment of the present invention will now be described in reference with the drawings.

Figure 2:
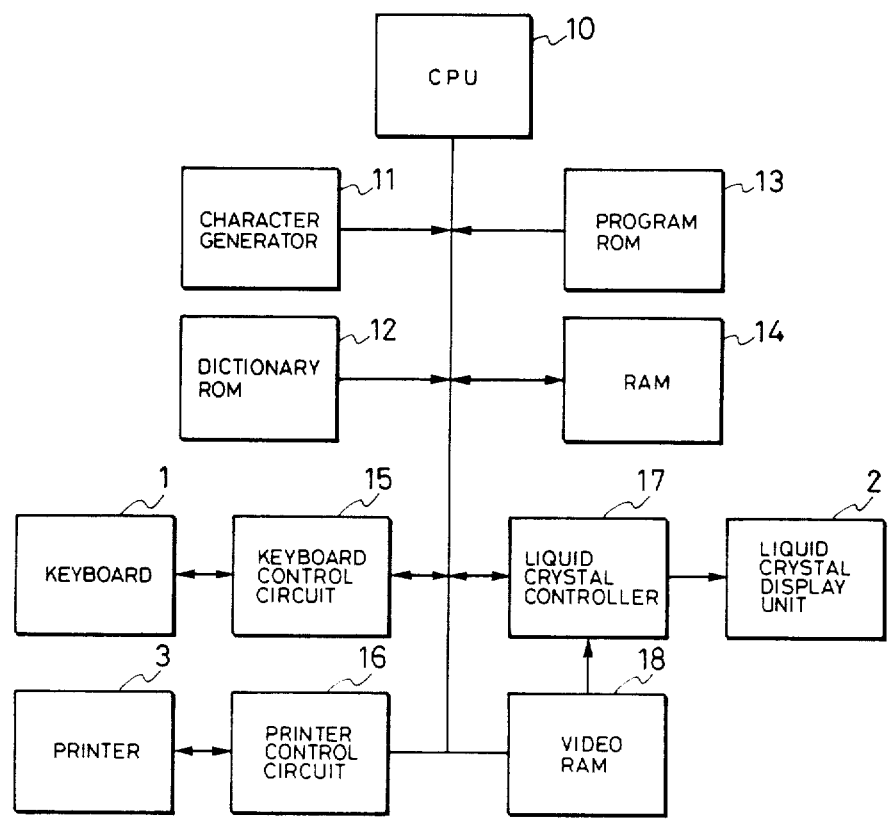
FIG. 2 is a block diagram for controlling the printing of a word processor having an insert printing function showing one embodiment according to the present invention.

FIG. 2 is a block diagram of a word processor having an insert printing function according to one embodiment of the present invention. The word processor comprises a CPU (Central Processing Unit) 10 which controls the whole system, a character generator 11 which stores the forms of characters, a dictionary ROM (Read Only Memory) 12 which stores a dictionary of words etc. used for preparing documents, a program ROM 13 which stores programs for executing the functions of the word processor, and a temporary storage RAM (Ramdom Access Memory) 14 which is a memory capable of reading and writing the data at any time to store the documents and data.

The word processor comprises further keyboard control circuit 15 which is an interface circuit that enables the input data from a keyboard 1 to be connected to the CPU 10, a printer control circuit 16 which instructs the operation of a printer 3 which is a thermal transfer type printer, a video RAM 18 which is a memory corresponding to liquid crystal unit dots of a liquid crystal display unit 2, and a liquid crystal controller 17 which drives the liquid crystal unit dot elements of the liquid crystal display unit 2 based upon the contents of the video RAM 18.

The keyboard 1 inputs the characters and code data. The liquid crystal display unit 2 displays the characters and codes corresponding to data that are input. The printer 3 prints the characters and codes displayed on the liquid crystal display unit 2. The CPU 10 controls the keyboard 1, the liquid crystal display unit 2 and the printer 3.

The CPU 10 comprises the program ROM 13 for preparing the document data consisting of the characters and codes depending upon the document data input from the keyboard 1 and the temporary storage RAM 13 for storing the document data and the print interrupt control code and a print control means for reading the document data from the temporary storage RAM 13, sending the document data to the printer 3 to print the document data, and temporarily interrupting the printing when the print interrupt control code is detected.

Figure 3:
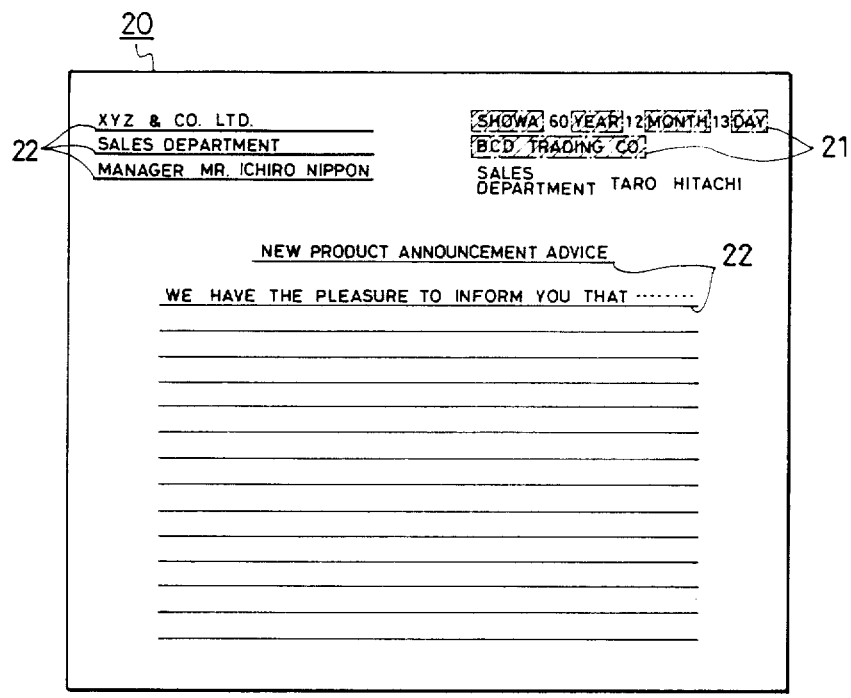
FIG. 3 is a document printed of a word processor having an insert printing function according to one embodiment of the present invention.

FIG. 3 illustrates a document 20 printed according to this embodiment of the present invention, wherein the trains of characters in hatched portions 21 and ruled line portions 22 have been printed on the regular paper in advance.

Figure 4:
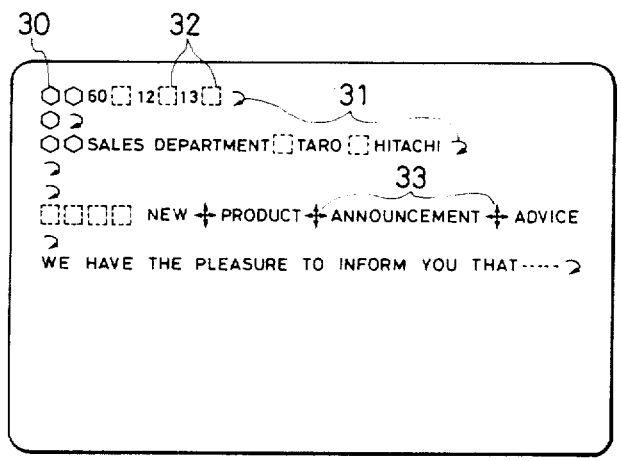
FIG. 4 shows a document to be inserted for printing the document shown in FIG. 3.

FIG. 4 illustrates the document 20 displayed on the screen of the liquid crystal display unit 2. In this embodiment of the present invention, however, the liquid crystal display unit 2 has only an area of two lines, so that the whole document 20 cannot be seen at one time through the liquid crystal display unit 2.

In FIG. 4, a print interrupt control code 30 is the visualization of a control code which indicates that the printing is to be interrupted for a while when this print interrupt control code 30 is detected while the CPU 10 is in operation in accordance with the print control program, i.e., when this mark has reached the timing for printing. A new paragraph code 31 is the visualization of a control code which indicates that the paper is to be fed by a predetermined amount which has been separately selected when this new paragraph code 31 has reached the timing for printing.

A blank code 32 is the visualization of a character code which indicates that nothing be printed at the position of this character. A double-scale code 33 is the visualization of a control code which indicates that a displayed character in front of this double-scale code 33 be printed on a scale two times as great in both the vertical and lateral directions as an ordinary size in which the characters stored in the character generator 11 are printed.

Figures 5, 6:
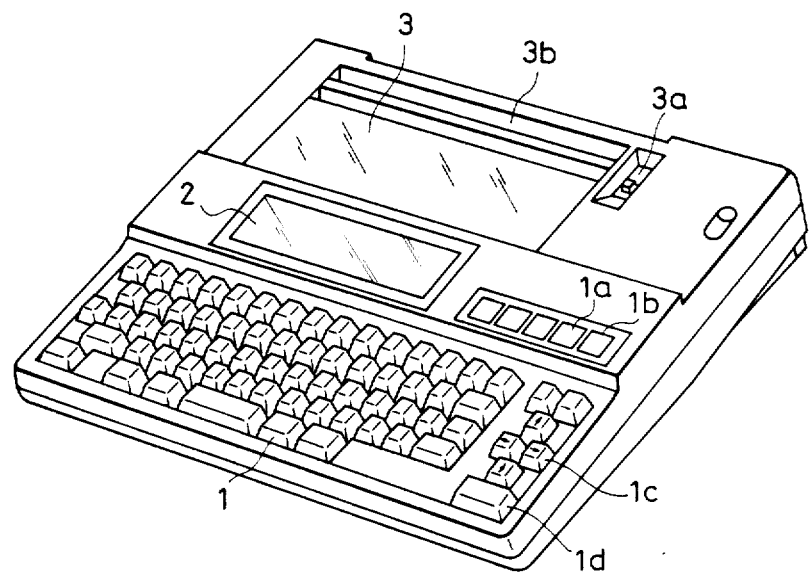
FIG. 5 illustrates an appearance of a word processor having an insert printing function showing one embodiment according to the present invention.
FIG. 6 is a display example of the train of characters newly prepared while the printing is being interrupted to print the document shown in FIG. 3.

FIG. 5 illustrates the appearance of the word processor having an insert printing function. The key arrangement of the keyboard 1 includes a print key 1a, a print interrupt code key 1b, a cursor key 1c, and an execution key 1d which is used also in order to resume the printing from the print interrupt condition.

Described below is a method of displaying a document on the liquid crystal display unit 2 using the keyboard 1. The operator operates the keyboard 1 to input a code of processing operation and codes such as kana characters, English characters and numerical Figures to the CPU 10.

When there is a train of characters containing Chinese characters which correspond to the input train of kana characters, the CPU 10 finds the train of characters containing the Chinese characters in the dictionary ROM 12. When there are many trains of characters containing Chinese characters which correspond to the train of kana characters, the operator instructs the selection through the keyboard 1.

To input the control code of print interrupt to stop the printing operation of the thermal transfer printer 3 which is performing the printing and to display this control code, the operator depresses the print interrupt code key 1b at the position of a character where it is desired to stop the printing on the document. When the document is being prepared, however, no particular operation for print is carried out even when the print interrupt code key 1b is depressed.

The RAM 14 stores a character code of the thus prepared Japanese document which contains kana characters, Chinese characters, and the print interrupt control code. To display part of the stored document on the liquid crystal display unit 2, the CPU 10 stores the character forms of the character generator 11 in the video RAM 18 having a memory location corresponding to each of the liquid crystal unit dots of the liquid crystal display unit 2. The data is input as described above to prepare a document that is shown in FIG. 4.

The paper, which has been printed in advance as shown in FIG. 3, is inserted in a paper insert port 3b of the printer under the condition where the paper set lever 3a is released. After the paper set lever 3a is set, both the key (not shown) for paper feed and the key (not shown) for paper return are depressed to set the paper at a predetermined position.

In response to control signals sent from the CPU 10 via the printer control circuit 16, the paper is fed, the printing head is moved, and the current which flows into the printing head is controlled thereby to record the characters. To print the characters, the operator depresses the print key 1a on the keyboard 1 to start a program for print processing in the CPU 10.

Figure 1:
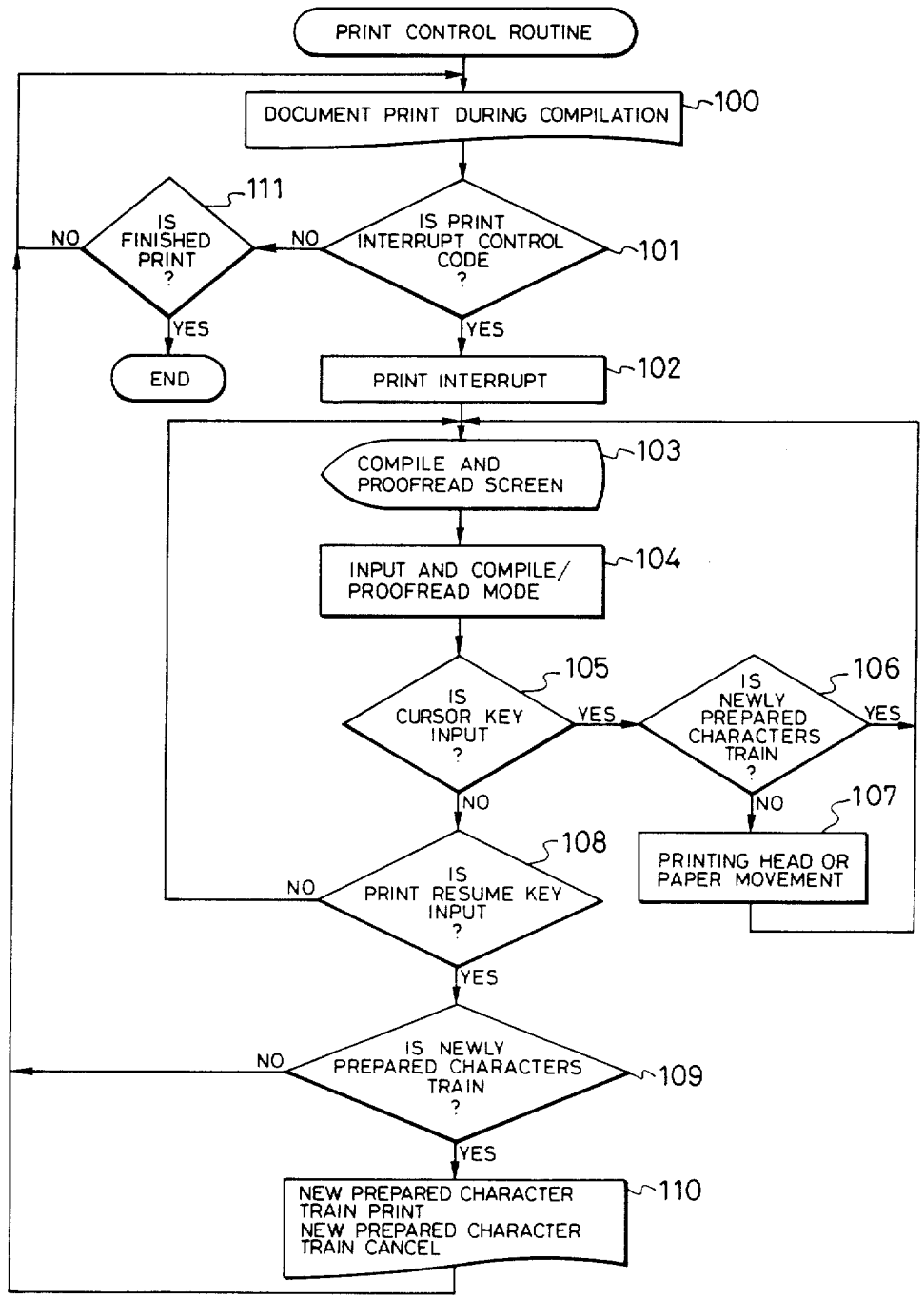
FIG. 1 is a flow chart for controlling the printing of a word processor having an insert printing function showing one embodiment according to the present invention.

FIG. 1 shows the flow chart of print control according to the print processing program. In a processing step 100 of print processing, the CPU 10 converts the character codes of the document stored in the RAM 14 into characters using the character generator 11 to send them to the thermal transfer printer 3. However, when the print interrupt control code is detected at the processing step 101 of print interrupt control code discrimination processing, the print processing program is transferred to a processing step 102 of print interrupt processing to interrupt the printing.

At a processing step 103, a screen for compiling and proofreading is displayed on the liquid crystal display unit 2, and the processing program is transferred to a processing step 104 of input compile/proofread processing to enter into the mode which enables the input to be compiled.

When it is attempted to print the document data shown in FIG. 4, the condition is assumed where the print interrupt control code 30 at the head of the sentence is detected. Under this condition, it is allowed to newly prepare a train of characters in addition to the document which has been prepared already in the RAM 14.

Under the condition prior to newly preparing a train of characters in the mode of input compile/proofread processing, if there is a cursor key input, the printing head is moved in the right and left directions by the inputs of the cursor key 1c, i.e., by the right and the left cursor keys 1c and the paper is moved in the up and down directions by the inputs of the cursor key 1c, i.e., by the up and the down cursor keys 1c in the processing steps 105 to 107.

Owing to these functions, the printing head can be moved to any position on the paper which has been printed in advance as shown in FIG. 3, to adjust the printing position visually. That is, the printing position can be selectively determined.

The operator sets the paper, selects the position of the printing head, and inputs the character code through the keyboard 1 to newly prepare the train of characters which will be used as the train of characters which will be used as a train of characters to be inserted.

FIG. 6 shows a train of characters representing a company name of a client which is to be inserted in the document of FIG. 4, and which is displayed on the liquid crystal display unit 2, to print the document which is shown in FIG. 3. The newly prepared train of characters is stored in the RAM 14, but is not inserted or stored in the document which has been prepared already. After the printing has been effected starting from the positioning point, the newly prepared train of characters is erased from the RAM 14 if the execution key 1d of the keyboard 1 is depressed.

When the key is depressed to resume the printing, i.e., when the execution key 1d is depressed, the printing operation is resumed through the processing steps 108 to 110, whereby the above-mentioned processing is executed with the newly prepared train of characters as a head. The train of characters is printed until the next print interrupt control code is detected. When there is no more document and data to be printed, the print processing is finished through a processing step 111.

According to this embodiment of the present invention, the function of insert printing can be provided for a word processor which is not equipped with the device for storing a plurality of the documents.

Further, since the position of the printing head can be selectively determined, the word processor makes it possible to effect the insert printing function onto the regular paper as well as to effect the superposed printing.

Moreover, the inked ribbon can be exchanged while the printing is being interrupted. Therefore, it is possible to provide a word processor which is capable of printing to the trains of characters in any color.

Though the description of this embodiment of the present invention has dealt with the liquid crystal display unit and the thermal transfer printer, it should be pointed out that the present invention can further be adapted to other display devices such as a CRT (Cathode Ray Tube) and to other serial-type printers.

Further, even when the word processor is equipped with a memory such as a floppy disc, it does not at all hinder the present invention from being realized.

According to the embodiment of the present invention, the print interrupt control codes are contained in advance in the document, the printing is stopped when the print interrupt control code is detected during printing the document, and the train of characters is newly prepared under this condition.

Therefore, there is provided a word processor having a function to print the newly prepared train of characters when the printing is resumed, to easily effect the insert printing even when the word processor is not equipped with memory such as a floppy disc to store the documents, to effect the printing onto the regular paper, to print the trains of characters in different colors, and to effect the superposed printing.

I claim:

1. A word processor having an insert printing function comprising:
   input means for inputting character data and code data;
   display means for displaying characters and codes corresponding to data being inputted by said input means;
   printing means for printing the characters and codes displayed on said display means; and
   central control means responsive to said input means for controlling said display means and said printing means, including:
   (a) input processing means for preparing document data consisting of characters and/or codes depending upon document data inputted by said input means and including a print interrupt control code;

(b) temporary storage means for storing said document data and print interrupt control code;

(c) print control means responsive to a start control from said input means for reading-out document data from said temporary storage means, for sending the read-out document data to said printing means so as to print the document data, and for temporarily interrupting the operation of said printing means when read out of said print interrupt control code is detected; and (d) means responsive to detection of said print interrupt control code for operating said input processing means when the operation of said printing means is interrupted to process a new train of characters received from said input means by storing the new train of characters in said temporary storage means;

wherein said print control means includes means for selectively determining a position for printing said new train of characters input during the interruption of said printing means in response to a position control signal input from said input means during said interruption, so that the printing of said new train of characters may be effected at an arbitrary selected position.

2. A word processor having an insert printing function according to claim 1, wherein said print control means further includes means for automatically deleting the new train of characters from said temporary storage means after the new train of characters, which were inputted during the interruption of said printing means, have been printed in a subsequent operation of said printing means.

* * * * *